United States Patent
Stoever et al.

(10) Patent No.: US 6,405,815 B1
(45) Date of Patent: Jun. 18, 2002

(54) NESTABLE FLUID COUPLER

(75) Inventors: Guy T. Stoever, Naperville, IL (US); Jimmie Clifford, Bettendorf, IA (US); Gerard Restaino, III, Chicago, IL (US)

(73) Assignee: Case Corp., Racine, WI (US)

( * ) Notice: Subject to any disclaimer, the term of this patent is extended or adjusted under 35 U.S.C. 154(b) by 0 days.

(21) Appl. No.: 09/478,465

(22) Filed: Jan. 6, 2000

(51) Int. Cl.$^7$ ................................................ B60K 17/28
(52) U.S. Cl. ................... 180/53.4; 74/11; 137/594; 137/614.04; 251/149.1; 251/149.6
(58) Field of Search ............................. 180/53.4; 74/11; 137/594, 614.04, 351; 251/149.1, 149.6

(56) References Cited

U.S. PATENT DOCUMENTS

| | | | | | |
|---|---|---|---|---|---|
| 3,653,405 | A | * | 4/1972 | Nelson | 137/594 |
| 3,730,221 | A | * | 5/1973 | Vik | 137/614.04 X |
| 4,074,698 | A | * | 2/1978 | Hobson et al. | 137/614.04 X |
| 4,119,118 | A | * | 10/1978 | Patel | 137/594 X |
| 4,881,573 | A | * | 11/1989 | Durant et al. | 137/614.04 |
| H804 | H | | 8/1990 | Dobbins | 285/345 |
| 5,082,245 | A | * | 1/1992 | Kast | 137/614.04 X |
| 5,464,042 | A | * | 11/1995 | Haunhorst | 137/594 |
| 5,651,567 | A | | 7/1997 | Kaleniecki et al. | 285/121.3 |
| 5,682,954 | A | * | 11/1997 | Burns | 180/290 |
| 5,829,337 | A | * | 11/1998 | Barden | 137/614.04 X |
| 5,988,221 | A | * | 11/1999 | Walker | 137/614.04 |
| 6,095,181 | A | * | 8/2000 | Irwin | 137/614.04 X |
| 6,223,841 | B1 | * | 5/2001 | Susag et al. | 180/53.4 |

* cited by examiner

*Primary Examiner*—Lanna Mai
*Assistant Examiner*—Toan To
(74) *Attorney, Agent, or Firm*—A. N. Trausch

(57) ABSTRACT

The hydraulic coupler is used for connecting a valve to a tool used with a vehicle having a hydraulic pump and fluid communication with the valve through hydraulic plumbing. The hydraulic coupler comprises a coupler body having a base portion, a neck portion and a connector portion. The coupler body is two connector chambers in the connector portion which are in fluid communication with two apertures, which when the hydraulic coupler is mounted on the valve, are in fluid communication with the valve. A connector assembly, typically of the quick-connect type, is mounted in each connector chamber and is configured to receive hydraulic plumbing to connect the valve to the tool. One embodiment provides that the coupler body is narrower than the valve on which it is mounted. Another embodiment provides before the connector portion to be offset from the neck portion thereby allowing the hydraulic couplers to be mounted immediately adjacent to each other but rotate at a 180° in relation to the other hydraulic coupler. Such arrangement forms a nested stack of hydraulic couplers mounted on the work vehicle at convenient locations on the vehicle.

6 Claims, 6 Drawing Sheets

NESTABLE FLUID COUPLER

FIELD OF THE INVENTION

The present invention relates to a fluid coupler for agricultural and industrial applications, and more particularly to a fluid coupler mounted directly to a valve and configured to nest when a plurality of coupler/valve units are arranged in a stacked array.

BACKGROUND OF THE INVENTION

Fluid couplers are used to facilitate the attachment and nonattachment of various tools and implements to valves that control the operations of such tools and implements. In the agricultural and industrial markets, the fluid couplers typically are of the quick-connect type. Such quick-connect type fluid couplers enable ready coupling and uncoupling of hydraulic plumbing to and from the tools being operated.

In many cases it is not unusual to have two or more valves mounted immediately adjacent to each other in a stacked array. Since several valves are associated with the various operations of the tool or implement the valves are operating. It is known in the prior art that to provide a coupler for each valve the coupler is either integral with the valve thereby forming a single coupler/valve assembly or two or more coupler sizes are provided to facilitate adjacent positionings of such couplers. A third alternative is to mount a coupler remote from the valve to which it is associated and connect the valve and coupler with hydraulic plumbing of suitable lengths. Problems associated with such alternative arrangements include fluid pressure drops between the coupler and the valve in either the remote mounting arrangement or the different coupler size arrangements. Such pressure drops can affect the efficient operation of the tool connected to such couplers. In the specific application of an articulated tractor, the valve is usually mounted in one section of the tractor near the hydraulic pump that supplies the hydraulic fluid pressure but the coupler is mounted in the other section of the tractor near the tool and implement hitch. As a result, there is an input hose and an output hose connecting each valve/coupler combination between the two sections of the articulated tractor. In some instances these can be as many as ten hose pairs that have to be supported and protected. If the valve and the coupler can be mounted on the tractor section near the tool hitch, there would only be one pair of hoses between the pump and valves with a manifold used to distribute the hydraulic fluid to the hydraulic fluid to the respective valves. In the arrangement of an integral valve and coupler the problem is a matter of bulk. The integral body is heavy and large relative to the valve and coupler functions and more material is needed then would otherwise be necessary, which increases the cost of the integral valve/coupler assembly.

Thus there is a need for a fluid coupler that is removably attached to a valve. There is a further need for the fluid coupler and can be mounted to a valve that is arranged with additional valves in a stacked array, either vertically or horizontally with adjacent fluid couplers nested within the perimeters of their associated valves.

SUMMARY OF THE INVENTION

The present invention provides a hydraulic coupler. The hydraulic coupler is used for connecting a valve to a tool used with a vehicle having a hydraulic pump and fluid communication with the valve through hydraulic plumbing. The hydraulic coupler comprises a coupler body having a base portion, a neck portion and a connector portion. The coupler body is two connector chambers in the connector portion which are in fluid communication with two apertures, which when the hydraulic coupler is mounted on the valve, are in fluid communication with the valve. A connector assembly, typically of the quick-connect type, is mounted in each connector chamber and is configured to receive hydraulic plumbing to connect the valve to the tool. One embodiment provides that the coupler body is narrower than the valve on which it is mounted. Another embodiment provides before the connector portion to be offset from the neck portion thereby allowing the hydraulic couplers to be mounted immediately adjacent to each other but rotate at a 180° in relation to the other hydraulic coupler. Such arrangement forms a nested stack of hydraulic couplers mounted on the work vehicle at convenient locations on the vehicle.

Another embodiment of the present invention is a work vehicle comprising a work structure, a plurality of wheels rotably mounted on the vehicle structure, a power source having an output shaft mounted on the vehicle structure and coupled to a transmission with the transmission operatively coupled to at least two of the wheels, and a hydraulic pump coupled to the power source and in fluid communication with at least one valve through hydraulic plumbing and a hydraulic coupler for connecting the valve to a tool. The hydraulic coupler comprises a coupler body having a base portion, a neck portion and a connector portion. The coupler body is two connector chambers in the connector portion which are in fluid communication with two apertures, which when the hydraulic coupler is mounted on the valve, are in fluid communication with the valve. A connector assembly, typically of the quick-connect type, is mounted in each connector chamber and is configured to receive hydraulic plumbing to connect the valve to the tool. One embodiment provides that the coupler body is narrower than the valve on which it is mounted. Another embodiment provides before the connector portion to be offset from the neck portion thereby allowing the hydraulic couplers to be mounted immediately adjacent to each other but rotate at a 180° in relation to the other hydraulic coupler. Such arrangement forms a nested stack of hydraulic couplers mounted on the work vehicle at convenient locations on the vehicle.

A further embodiment of the present invention is a coupler comprising a body having a neck portion and a connector portion with the connector portion having a cavity with a means for engaging hydraulic plumbing mounted in the cavity. A means for mounting the body of the coupler to a valve and a means for fluid communication between the means for engaging and the valve through the neck portion of the coupler. The coupler can be provided with an additional cavity in the connector portion of the body and having a means for engaging hydraulic plumbing mounted in such additional cavity. One feature of the coupler is that the coupler body is narrower than the valve on which it is mounted and another feature is the connector portion is offset from the neck portion. Such features allow an additional coupler mounted to an additional valve immediately adjacent to the other coupler but rotated 180° in relation to the other coupler. Further, a plurality of couplers corresponding to a plurality of valves with each coupler mounted adjacent to another coupler and rotated 180° in relation to that coupler thereby forming a nested array of couplers can be utilized.

DETAILED DESCRIPTION OF THE PREFERRED EMBODIMENT

Figure 1:
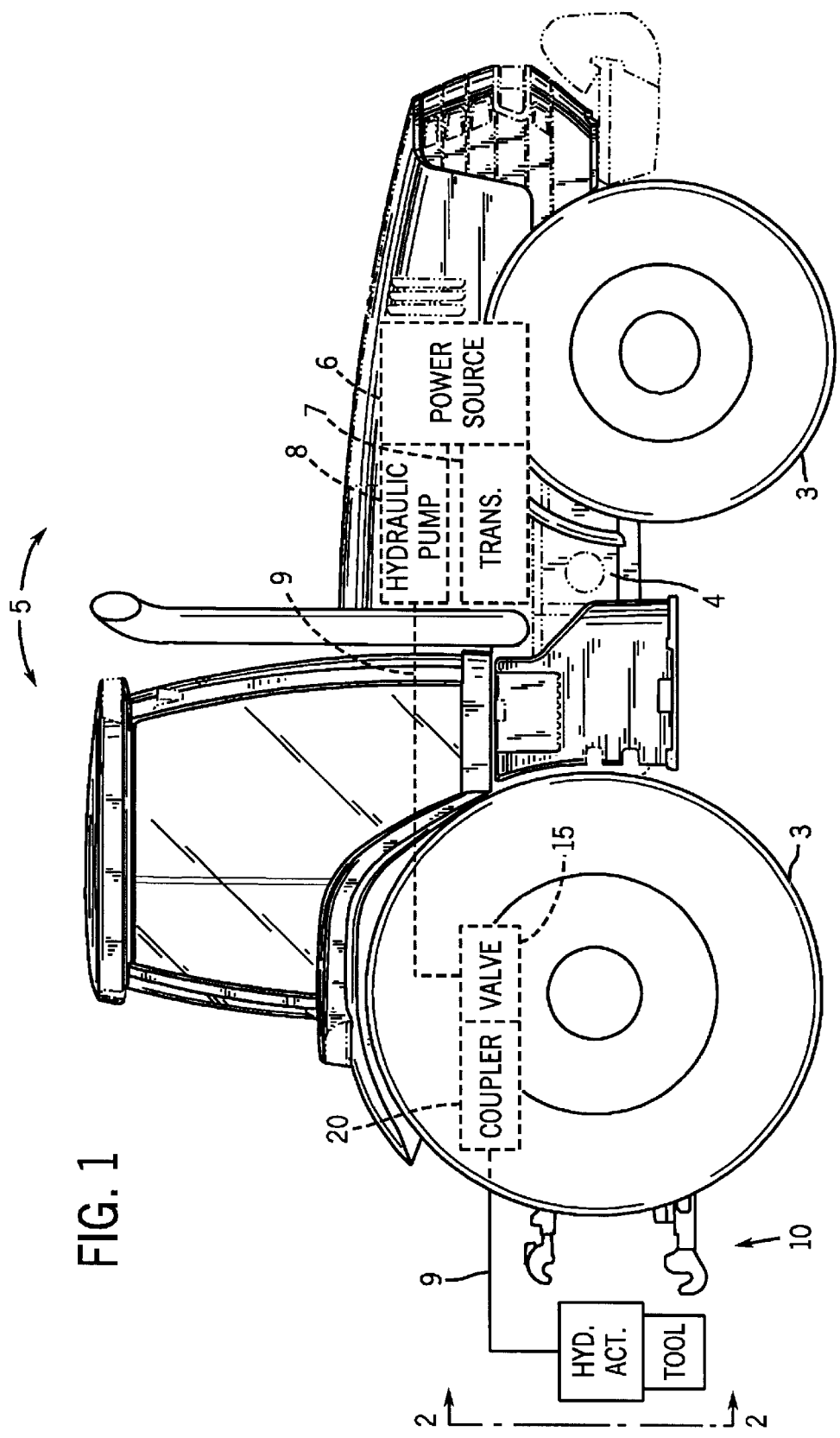
FIG. 1 is a side elevation of a work vehicle with an embodiment of the hydraulic coupler mounted at the rear of the vehicle.

Turning to the drawings, FIG. 1 illustrates a work vehicle 5 having a vehicle support structure 4 with wheels rotably mounted on the structure. A power source 6 is mounted on the vehicle support structure 4 and coupled to a transmission 7. The power source 6 can be an internal combustion engine such as a gasoline or a diesel engine. The power source 6 and the transmission 7 can be configured to provide 2 or 4-wheel drive to the vehicle 5. The work vehicle 5 can be used in the agricultural, industrial and construction industries. The work vehicle 5 can also be an articulated vehicle or a tracked vehicle wherein wheels support the tracks. A hyrdraulic pump 8 is coupled to the power source 6 to pump fluid, such as hydraulic oil, to a hydraulic actuator, which actuator imparts motion to a tool 10 coupled to the actuator. Hydraulic plumbing 9 of the rigid or flexible type connects and provides fluid communication between the hydraulic pump 8 and the hydraulic actuator. The hydraulic actuator can be a rod and cylinder, or a hydraulic motor. Control of the input and output flow of fluid between the hydraulic pump, and the actuator for a tool 10 is provided by a valve 15. The tool 10, for example, can be a back hoe attachment and arm with a bucket, or a baler, or a cold scraper, or a planter, etc.

Figure 2:
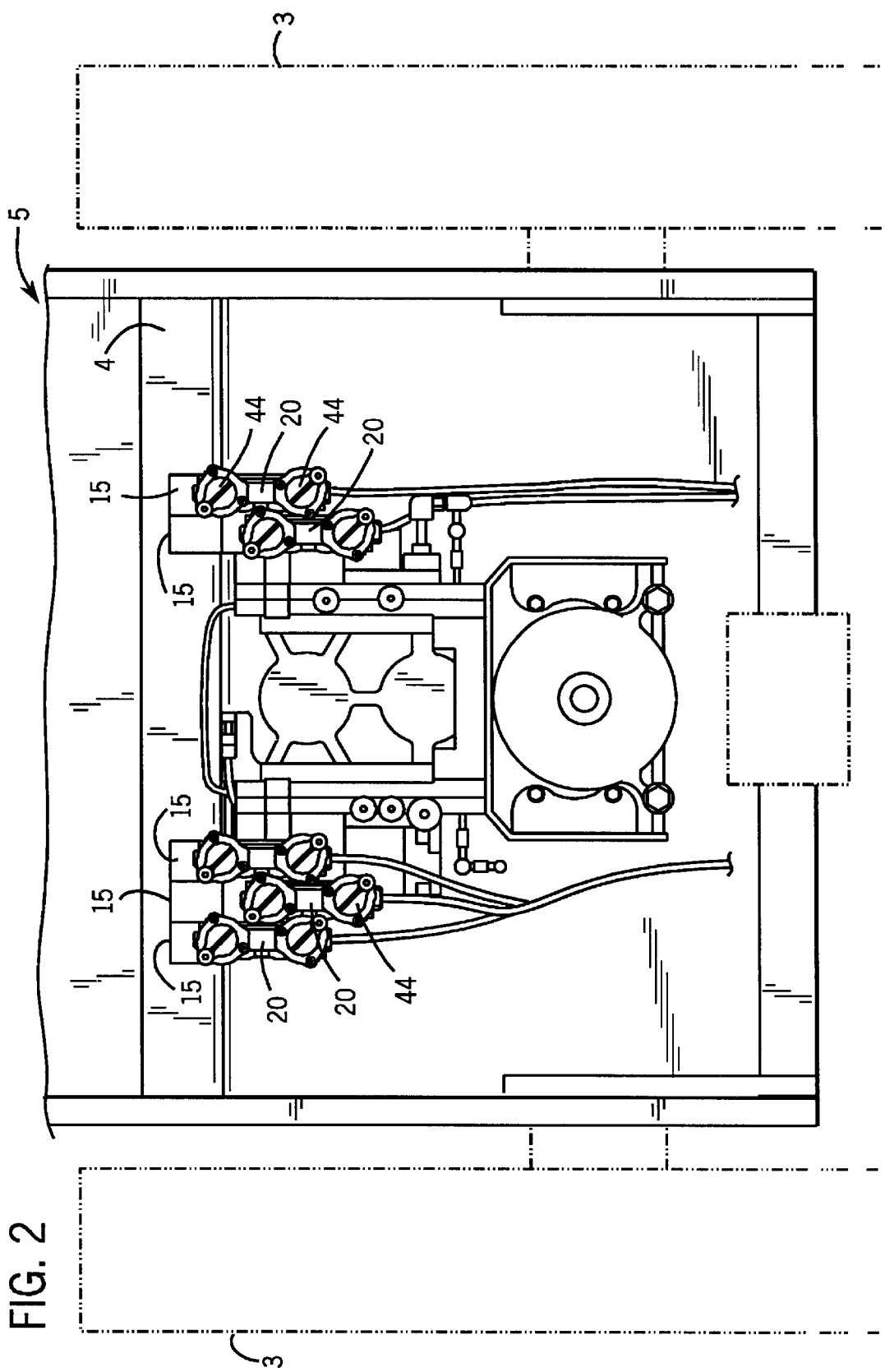
FIG. 2 is a partial rear elevation of the work vehicle depicted in FIG. 1, illustrating a plurality of valves in a stacked array of three and two valves with the present hydraulic coupler mounted on each valve, with the hydraulic coupler forming a nested stack in a vertical aspect.
Figure 3:
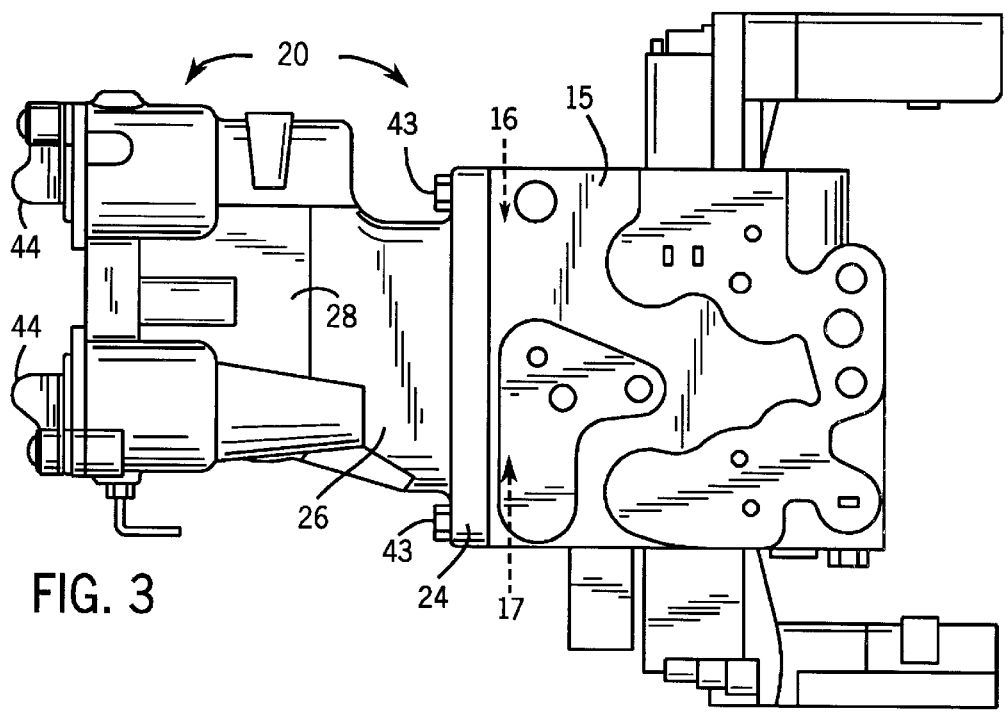
FIG. 3 is a side elevation of a hydraulic coupler mounted directly on a valve.
Figure 4:
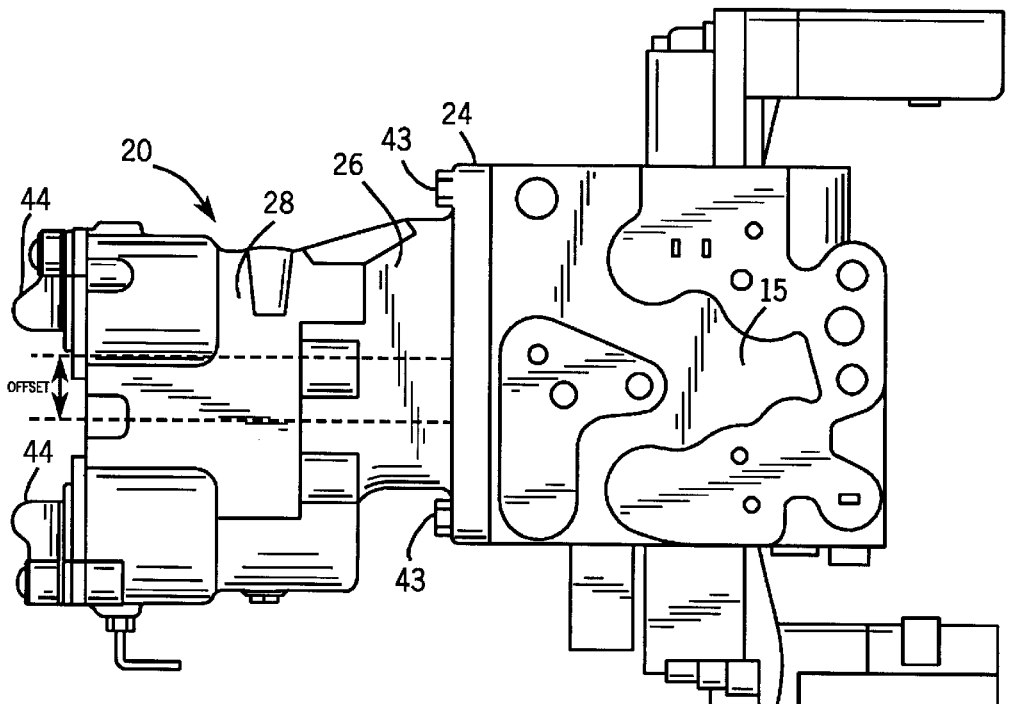
FIG. 4 is a side elevation of the hydraulic coupler illustrated in FIG. 3 mounted on the valve but rotated 180° and illustrating the offset of the connector portion of the coupler body from the neck portion of the coupler body.
Figure 5:
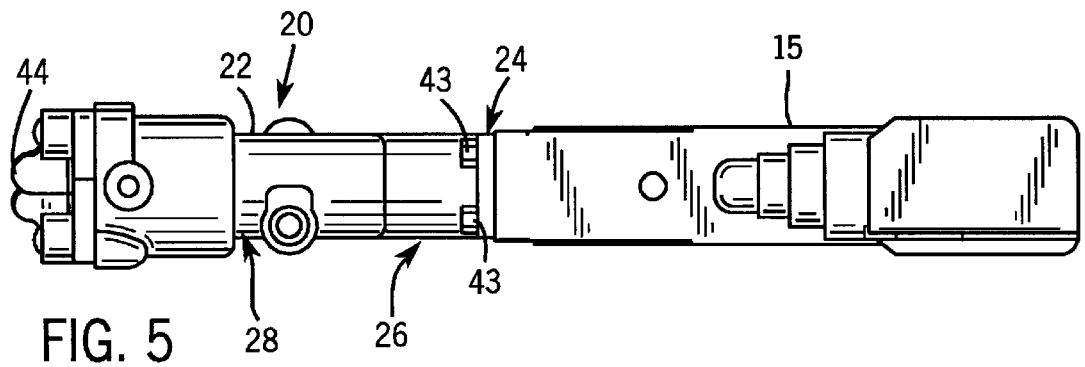
FIG. 5 is a top view of the hydraulic coupler mounted on the valve as illustrated in FIG. 3 showing that the coupler body is narrower than the valve.
Figure 7:
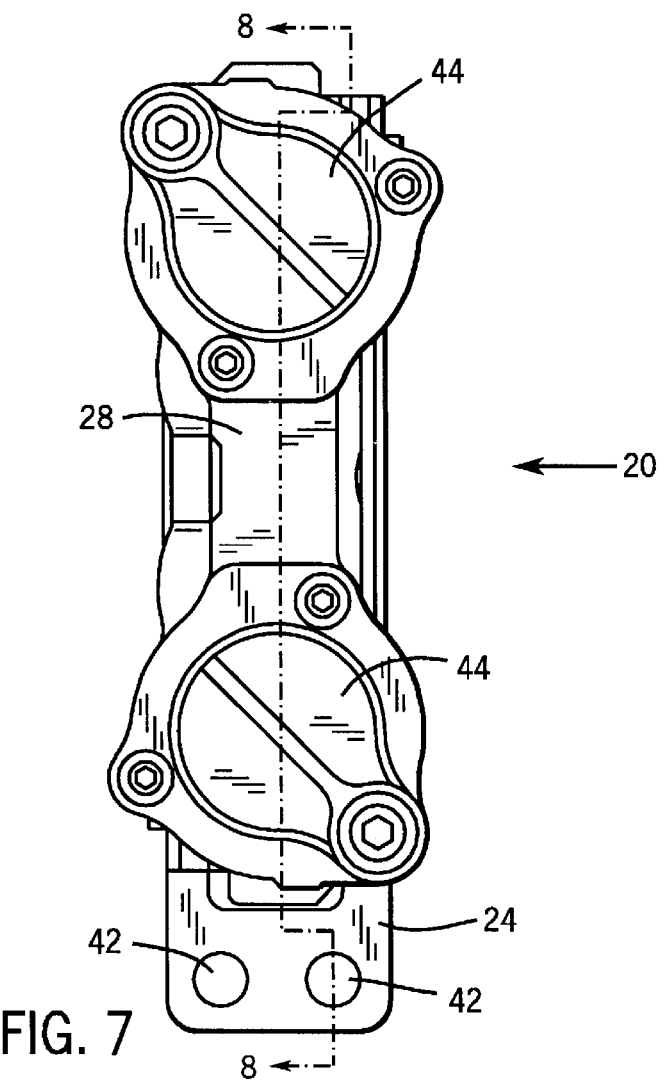
FIG. 7 is a front end view of a hydraulic coupler.
Figure 8:
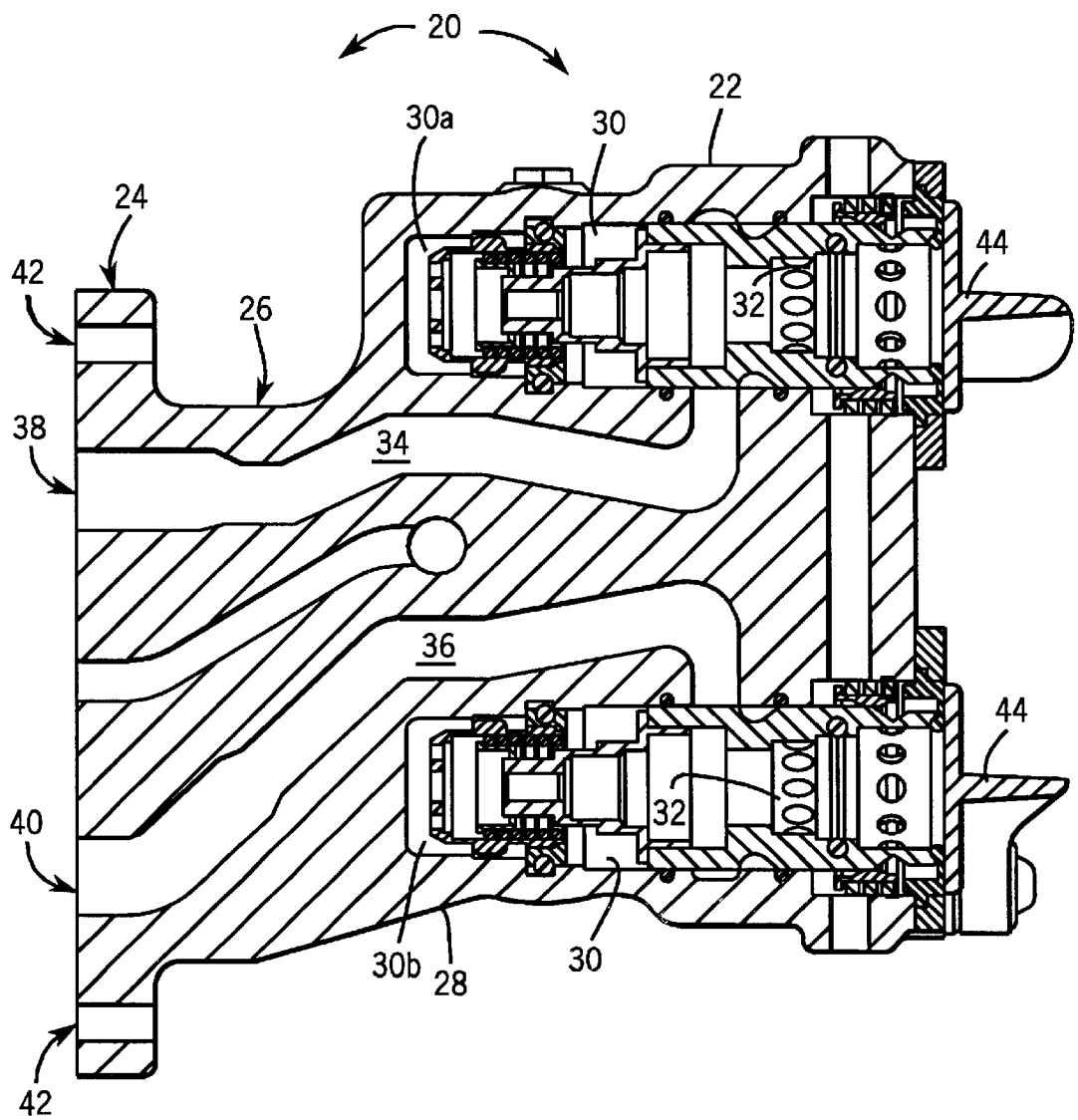
FIG. 8 is a sectional view of the hydraulic coupler illustrated in FIG. 7

Referring now to FIGS. 2–8 there is illustrated a hydraulic coupler 20 mounted on a valve 15. The hydraulic coupler 20 comprises a coupler body 22 having a base portion 24, a neck portion 26 and a connector portion 28. The connector portion 28 is provided with a connector chamber 30 which is a cavity configured to accept a quick-connect assembly 32. The quick connect assembly 32 is of the conventional and any convenient type that allows a connector to be inserted and locked in position by pushing into the assembly and disconnecting the connector by pulling from the assembly. The hydraulic coupler 20 has a first connector chamber 30a and a second connector chamber 30b provided in the connector portion 28 of the coupler body 22. The first connector chamber 30a is in fluid communication with a first aperture 38 through a first fluid passage 34 and the second connector chamber 30b is in fluid communication with a second aperture 40 through a second fluid passage 36. The first and second apertures 38, 40 align with an input orifice 16 and an output orifice 17 of the valve 15. The coupler body 22 is narrower than the valve 15. See FIG. 5. The hydraulic coupler 20 has the connector portion 28 offset from the neck portion 26. The offset can be of any distance that is convenient and appropriate for the specific valve application selected by the operator. FIGS. 3, 4 and 8 illustrate one embodiment of the present hydraulic coupler with a given offset. The neck portion 26 of the coupler body 22 should be as short as possible but its size will be governed by the casting or machinery requirements during manufacturer and by the size and length of the fastener used to attach the hydraulic coupler 20 to the valve 15.

Figure 6:
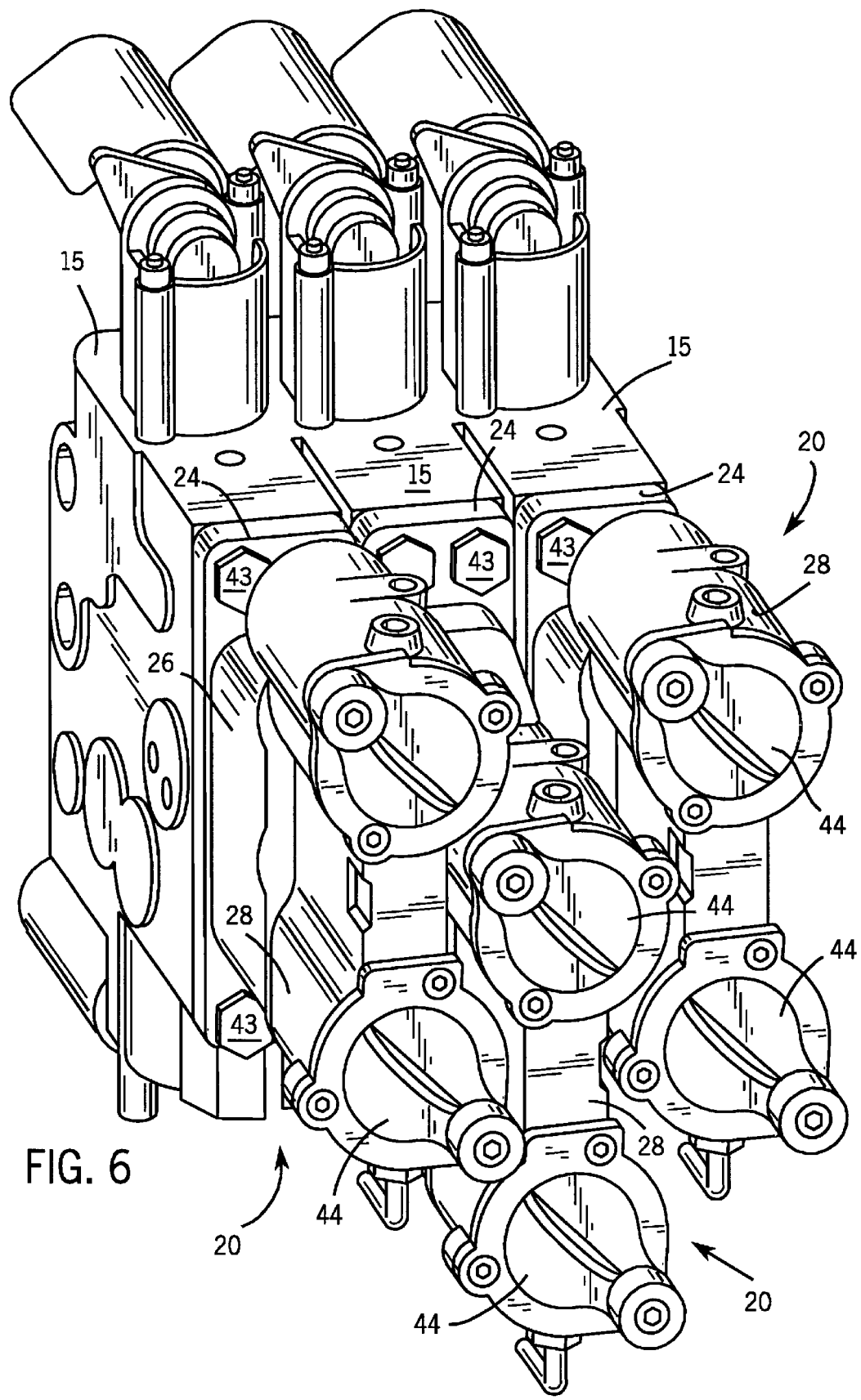
FIG. 6 is a perspective view of a nested stack of hydraulic couplers mounted on individual valves with each immediately adjacent hydraulic coupler rotated 180° in relation to the other hydraulic coupler.

The narrow coupler body 22 and the offset facilitate the nesting of two or more hydraulic couplers 20 when mounted on a plurality of valves 15. FIG. 6 illustrates three hydraulic couplers 20 forming a nested stack of hydraulic couplers mounted on adjacent valves 15 with each hydraulic coupler mounted adjacent to another hydraulic coupler and rotated 180° in relation to the other hydraulic coupler. FIG. 2 illustrates a plurality of hydraulic couplers mounted at the rear of a work vehicle 5. The left side of the figure illustrates the plurality of hydraulic couplers 20 corresponding to a plurality of valves 15 with each hydraulic coupler 20 mounted adjacent to another hydraulic coupler 20 and rotated 180° in relation to the other hydraulic coupler 20 thereby forming a nested stack of hydraulic couplers. The right side of FIG. 2 illustrates a hydraulic coupler 20 including an additional hydraulic coupler 20 mounted to an additional valve 15 immediately adjacent to the other hydraulic coupler but rotated 180° in relation to the other hydraulic coupler. In both cases, the hydraulic coupler 20 is of the same configuration but is rotated 180° in relation to the adjacent coupler thereby facilitating the nesting of the couplers on stacked valves. It should be understood that even though the figures illustrate the couplers 20 and the valves 15 aligned in a vertical aspect, they can also be aligned in a horizontal aspect or any other configuration that allows stacking of the valves in an array selected by the operator of the work vehicle 5.

The hydraulic coupler 20 can be mounted directly to the valve 15 body by fasteners 43. See FIGS. 3, 4, 5 and 6. Each cavity 30 in the connector portion 28 of the coupler body 22 is provided with a coupler cover 44. The coupler cover 44 can be of any convenient and conventional design. The illustrated cover is mounted to the coupler body 22 with a pivot screw and is moved from one position to another position by use of a finger wing formed on the cover. It should be understood that the cover could also be slid on and off the coupler body 22 along channels formed in the coupler body 22 or attached to the coupler body. The covers 44 could also be a plug type cover that is inserted and removed from the cavity 30 of the coupler body 22. The coupler body 22 can be constructed from any suitable material that is compatible with the fluids moving through the connector chambers 30a, 30b and the fluid passages 34, 36. The preferred material for the coupler body 22 is metal, however, a composite material or an engineered plastic can also be utilized. The hydraulic coupler 20 can be molded or machined to accommodate the type of valve 15 to which the hydraulic coupler 20 will be mounted and the type of hydraulic plumbing 9 to be connected to the several quick-connect assemblies 32.

Thus, there is provided a hydraulic coupler 20 for connecting a valve 15 to a tool 10. The coupler body 22 is provided with an offset and is narrower than the valve 15 which facilitates the nesting of the hydraulic coupler 20 in a two or more stacked or array of valves particularly in a vertical or horizontal configuration. While several embodiments of the present invention have been disclosed and described in detail herein, various modifications may be made. For example, the preferred embodiment of a work vehicle 5 describes a vehicle having a frame that supports the power source 6, transmission 7 and wheels 3. Some vehicle structures such as agricultural tractors may not have a frame as a support structure but utilizes the engine block and transmission housing as part of the support structure for the wheels and axles. By way of further modification, the hydraulic coupler can be mounted on a valve at any location on the work vehicle. The present disclosure illustrates the nested hydraulic couplers mounted on stacked valves 15 at the rear of a work vehicle, however, the hydraulic coupler and valve assembly may be located at the front or sides of the work vehicle in order to facilitate the operation of the tool mounted near or adjacent such areas of the work vehicle. Such modifications and variations in use are intended to fall within the scope of the appended claims.

What is claimed is:

1. In a vehicle having a hydraulic pump in fluid communication with first and second valves through hydraulic plumbing, a hydraulic coupler array for connecting the first and second valves to a hydraulic actuator, the hydraulic coupler array having first and second hydraulic couplers, each coupler comprising:
   a coupler body having a base portion with first and second mounting points, a neck portion, and a connector portion;
   first and second connector cambers in the connector portion of the coupler body,
   a first aperture in fluid communication with the first connector chamber through a first fluid passage;
   a second aperture in fluid communication with the second connector chamber through a second fluid passage; and
   a connector assembly mounted in each connector chamber and configured to receive hydraulic plumbing thereby connecting the valve to the hydraulic actuator, wherein the first aperture is offset from the first mounting point and the second aperture is offset from the second mounting point, and
      wherein the coupler body is narrower than the valve, and
      wherein the first coupler body is configured to be mounted directly to the first valve, with the first and second apertures in direct filed communication with an input orifice and an output orifice of the first valve, and
      wherein the second coupler body is configured to be mounted to the second valve immediately adjacent the first hydraulic coupler, the second hydraulic coupler rotated 180 degrees in relation to the first hydraulic coupler.

2. The hydraulic coupler array of claim 1 wherein the first coupler and the second coupler form a nested stack hydraulic couplers.

3. A work vehicle comprising:
   a vehicle structure;
   a plurality of wheels rotatably mounted on the vehicle structure;
   a power source mounted on the vehicle structure;
   a hydraulic pump coupled to the power source;
   a first valve in fluid communication with the hydraulic pump through hydraulic plumbing;
   a second valve immediately adjacent the first valve; and
   first and second hydraulic couplers configured to connect the first and second valves to a hydraulic actuator, the first and second hydraulic couplers each comprising:
      a coupler body having a base portion with first and second mounting points, a neck portion, and a connector portion;
      first and second connector chambers in the connector portion of the coupler body;
      a first aperture in fluid communication with the first connector chamber through a first fluid passage;
      a second aperture in fluid communication with the second connector chamber through a second fluid passage; and
      a connector assemble mounted in each connector chamber and configured to receive hydraulic plumbing to connect the valve to the hydraulic actuator, wherein the first aperture is offset from the first mounting point and the second aperture is offset from the second mounting point,
         wherein the coupler body is narrower than the valve, and
         wherein the first coupler body is mounted directly to the first valve, with the first aperture and the second aperture in direct fluid communication with an input orifice and an output orifice, respectively, of the first valve, and
         wherein the second hydraulic coupler is mounted to the second valve immediately adjacent to the first hydraulic coupler and is in an orientation rotated 180 degrees in relation to the first hydraulic coupler.

4. The work vehicle of claim 3 wherein the first and second couplers form a nested stack of hydraulic couplers.

5. A coupler array for coupling at least first and second adjacent hydraulic valves to hydraulic plumbing, the coupler array having at least first and second couplers, each coupler comprising:
   a coupler body having a base portion with first and second mounting points, a neck portion and a connector portion with the connector portion having a cavity;
   a means for engaging hyrdraulic plumbing mounted in the cavity;
   a means for mounting the coupler body to the valve; and
   a means for fluid communication between the means for engaging and the hydraulic valves, through the neck portion, wherein the means for fluid communication define first and second fluid passages each said fluid passage having an aperture, wherein the aperture of the first fluid passage is offset from the first mounting point and the aperture of the second passage is oppositely offset from the second mounting point,
      wherein the coupler body is narrower than the valve, and
      wherein the first coupler body is mounted directly to the first valve, with the first aperture and the second aperture in direct fluid communication with an input orifice and an output orifice, respectively, of the first valve, and
      wherein the second hydraulic: coupler is mounted to the second valve immediately adjacent to the first hydraulic coupler and is in an orientation rotated 180 degrees in relation to the first hydraulic coupler.

6. The coupler array of claim 5 wherein the first coupler and the second coupler form a nested array of couplers.

* * * * *